(12) United States Patent
Fu et al.

(10) Patent No.: US 8,793,517 B2
(45) Date of Patent: Jul. 29, 2014

(54) MOTHERBOARD WITH VOLTAGE-STATE DISPLAY SYSTEM

(75) Inventors: Ying-Bin Fu, Shenzhen (CN); Yuan-Xi Chen, Shenzhen (CN); Ya-Jun Pan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 220 days.

(21) Appl. No.: 13/400,766

(22) Filed: Feb. 21, 2012

(65) Prior Publication Data
US 2013/0173934 A1 Jul. 4, 2013

(30) Foreign Application Priority Data
Dec. 30, 2011 (CN) .......................... 2011 1 0453206

(51) Int. Cl.
| | |
|---|---|
| G06F 1/00 | (2006.01) |
| G06F 1/26 | (2006.01) |
| H01J 1/60 | (2006.01) |
| H05B 37/00 | (2006.01) |
| H03K 3/017 | (2006.01) |
| H03K 7/08 | (2006.01) |

(52) U.S. Cl.
USPC ........... 713/300; 713/320; 315/129; 315/186; 327/172; 332/109

(58) Field of Classification Search
USPC ........... 713/300, 320; 315/129, 186; 327/172; 332/109
See application file for complete search history.

(56) References Cited

U.S. PATENT DOCUMENTS

| | | | | |
|---|---|---|---|---|
| 5,504,908 | A * | 4/1996 | Ikeda ............................. | 713/300 |
| 6,353,893 | B1 * | 3/2002 | Liu et al. ........................ | 713/323 |
| 6,658,577 | B2 * | 12/2003 | Huppi et al. ................... | 713/323 |
| 7,053,601 | B1 * | 5/2006 | Fenske et al. .................. | 324/127 |
| 7,579,959 | B2 * | 8/2009 | Choo ........................ | 340/815.45 |

\* cited by examiner

*Primary Examiner* — Stefan Stoynov
(74) *Attorney, Agent, or Firm* — Novak Druce Connolly Bove + Quigg LLP

(57) ABSTRACT

A motherboard includes a central processing unit (CPU), a drive, and a voltage-state display system to display a voltage mode of the CPU. The voltage-state display system includes a power management chip, a first transistor, a second transistor, a first light emitting diode (LED), and a second LED. A first phase output terminal of the power management chip is connected to the first LED through the first transistor. A second phase output terminal of the power management chip is connected to the second LED through the second transistor. The LEDs indicate the voltage mode of the CPU.

5 Claims, 2 Drawing Sheets

MOTHERBOARD WITH VOLTAGE-STATE DISPLAY SYSTEM

TECHNICAL FIELD

The present disclosure relates to motherboards, and particularly, to a motherboard having a voltage-state display system.

DESCRIPTION OF RELATED ART

When a voltage mode of a central processing unit (CPU) needs to be determined, an oscillograph may be connected to each phase output terminal of a power controller of the CPU. However, it is inconvenient to connect the oscillograph to each phase output terminal of the power controller of the CPU every time the information is required.

BRIEF DESCRIPTION OF THE DRAWINGS

Many aspects of the present embodiments can be better understood with reference to the following drawings. The components in the drawing are not necessarily drawn to scale, the emphasis instead being placed upon clearly illustrating the principles of the present disclosure. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Figure 1:
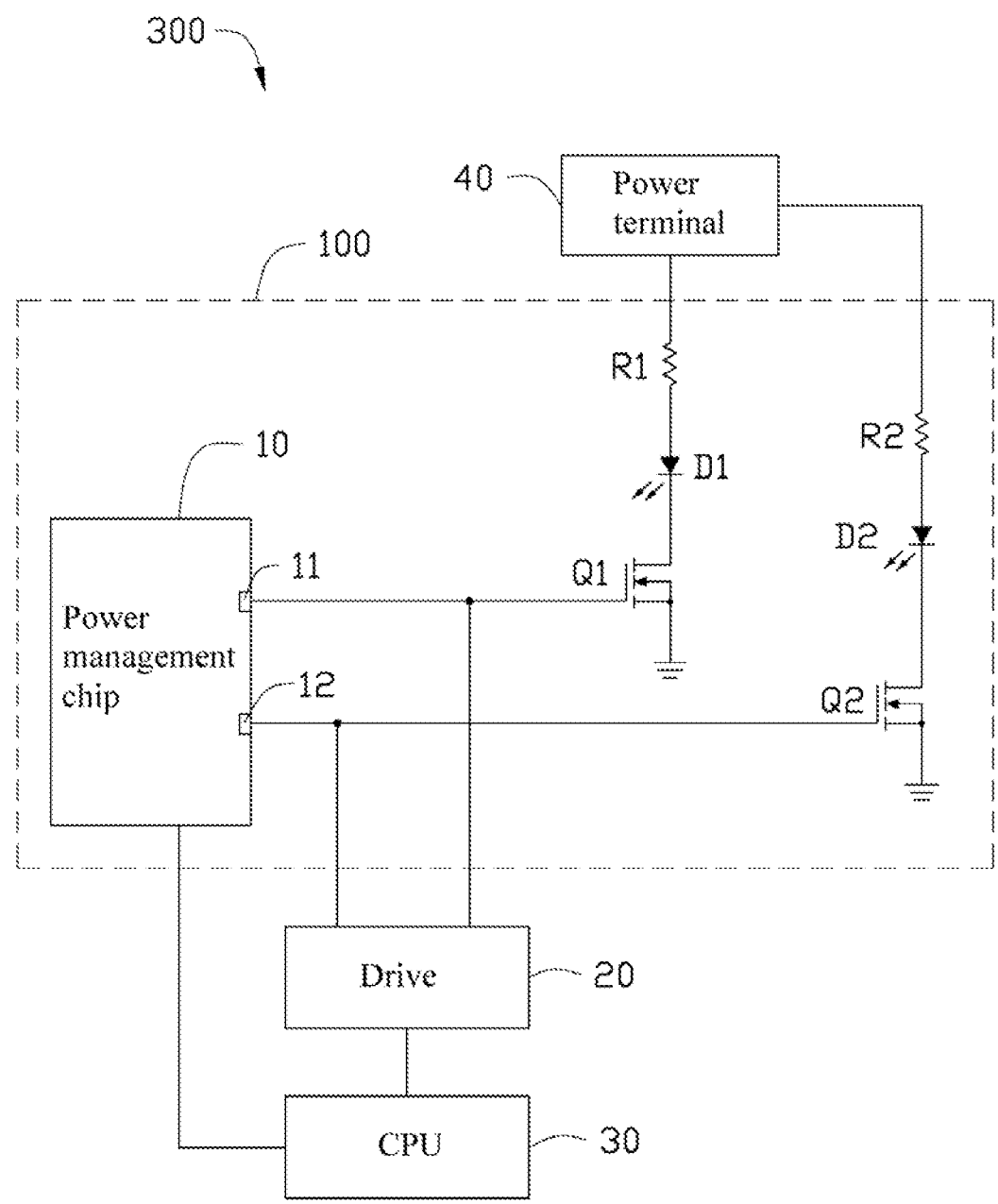
FIG. 1 is a circuit diagram of a first exemplary embodiment of a motherboard.

Referring to FIG. 1, a first embodiment of a motherboard 300 includes a central processing unit (CPU) 30, a drive 20, and a voltage-state display system 100.

The voltage-state display system 100 displays a voltage mode of the CPU 30. The voltage-state display system 100 includes a power management chip 10, a first transistor Q1, a second transistor Q2, a first light emitting diode (LED) D1, a second LED D2, a first resistor R1, and a second resistor R2. In the embodiment, the power management chip 10 is a two-phase power management chip.

The power management chip 10 includes a first phase output terminal 11 and a second phase output terminal 12. The first phase output terminal 11 outputs a first pulse width modulation (PWM) signal. The first phase output terminal 11 is connected to a control terminal of the first transistor Q1. The second phase output terminal 12 outputs a second PWM signal. The second phase output terminal 12 is connected to a control terminal of the second transistor Q2. A first terminal of the first transistor Q1 is connected to a cathode of the first LED D1. A second terminal of the first transistor Q1 is grounded. An anode of the first LED D1 is connected to a power terminal 40 of the motherboard 300 through the first resistor R1. A first terminal of the second transistor Q2 is connected to a cathode of the second LED D2. A second terminal of the second transistor Q2 is grounded. An anode of the second LED D2 is connected to the power terminal 40 of the motherboard 300 through the second resistor R2.

The first and second phase output terminals 11 and 12 of the power management chip 10 are also connected to the drive 20 to respectively output the first and second PWM signals to the drive 20. The drive 20 is connected to the CPU 30 to output corresponding voltages to the CPU 30 according to the received first and second PWM signals. The CPU 30 is connected to the power management chip 10 to output a control instruction to the power management chip 10 to denote the voltage mode needed by the CPU 30, thereby controlling the power management chip 10 to adjust the first and second PWM signals.

According to INTEL standard, a power management chip has three work states, which are PS0 state, PS1 state, and PS2 state. If the power management chip only includes first and second phase power output terminals, in the PS0 state, the first and second phase output terminals both continuously output the PWM signal; in the PS1 state, only the first phase output terminal continuously outputs the PWM signal; in the PS2 state, only the first phase output terminal discontinuously outputs the PWM signal. If the power management chip includes at least three phase output terminals, in the PS0 state, the at least three phase output terminals continuously output the PWM signals; in the PS1 state, only first and second phase output terminals of the at least three phase output terminals continuously output the PWM signals; in the PS2 state, only the first phase output terminal of the at least three phase output terminals discontinuously outputs the PWM signal.

When the power management chip is in the PS0 state, the voltage mode of the CPU 30 is the PS0 mode. When the power management chip is in the PS1 state, the voltage mode of the CPU 30 is the PS1 mode. When the power management chip is in the PS2 state, the voltage mode of the CPU 30 is the PS2 mode.

In the first embodiment, the power management chip 10 only includes the first phase output terminal 11 and the second phase output terminal 12. Therefore, when the power management chip 10 is in the PS0 state, the first phase output terminal 11 continuously outputs the first PWM signal to the control terminal of the first transistor Q1, and the second phase output terminal 12 continuously outputs the second PWM signal to the control terminal of the second transistor Q2. When the control terminals of the first and second transistor Q1 and Q2 receive the high level signal, the first and second transistors Q1 and Q2 are turned on, at that time, the first and second LEDs D1 and D2 emit light. When the control terminals of the first and second transistors Q1 and Q2 receive a low level signal, the first and second transistors Q1 and Q2 are turned off, at that time, neither of the first and second LEDs D1 and D2 emit light. Owing to frequencies of the first and second PWM signals being too high, when the power management chip 10 is in the PS0 state, users can observe that the first and second LEDs D1 and D2 emits light.

When the power management chip 10 is in the PS1 state, the first phase output terminal 11 of the power management chip 10 continuously outputs the first PWM signal to the control terminal of the transistor Q1. The second phase output terminal 12 of the power management chip 10 does not output the second PWM signal. Therefore, the first LED D1 lights and the second LED D2 is not lit.

When the power management chip 10 is in the PS2 state, the first phase output terminal 11 of the power management chip 10 discontinuously outputs the first PWM signal to the control terminal of the first transistor Q1. The second phase output terminal 12 of the power management chip 10 does not output the second PWM signal. Owing to the first PWM signal outputting discontinuously to the control terminal of the first transistor Q1, when the power management chip 10 is in the PS2 state, the first LED D1 flickers, and the second LED D2 does not light.

The voltage mode of the CPU 30 can be observed through the first and second LEDs D1 and D2. When the first and second LEDs D1 and D2 are both lit, it denotes that the power management chip 10 is in the PS0 state. Therefore, the voltage mode of the CPU 30 is the PS0 mode. When the first LED D1 lights, while the second LED D2 is not lit, it denotes that the power management chip 10 is in the PS1 state. Therefore, the voltage mode of the CPU 30 is the PS1 mode. When the first LED D1 flickers, and the second LED D2 is not lit, it denotes that the power management chip 10 is in the PS2 state. Therefore, the voltage mode of the CPU 30 is the PS2 mode.

Figure 2:
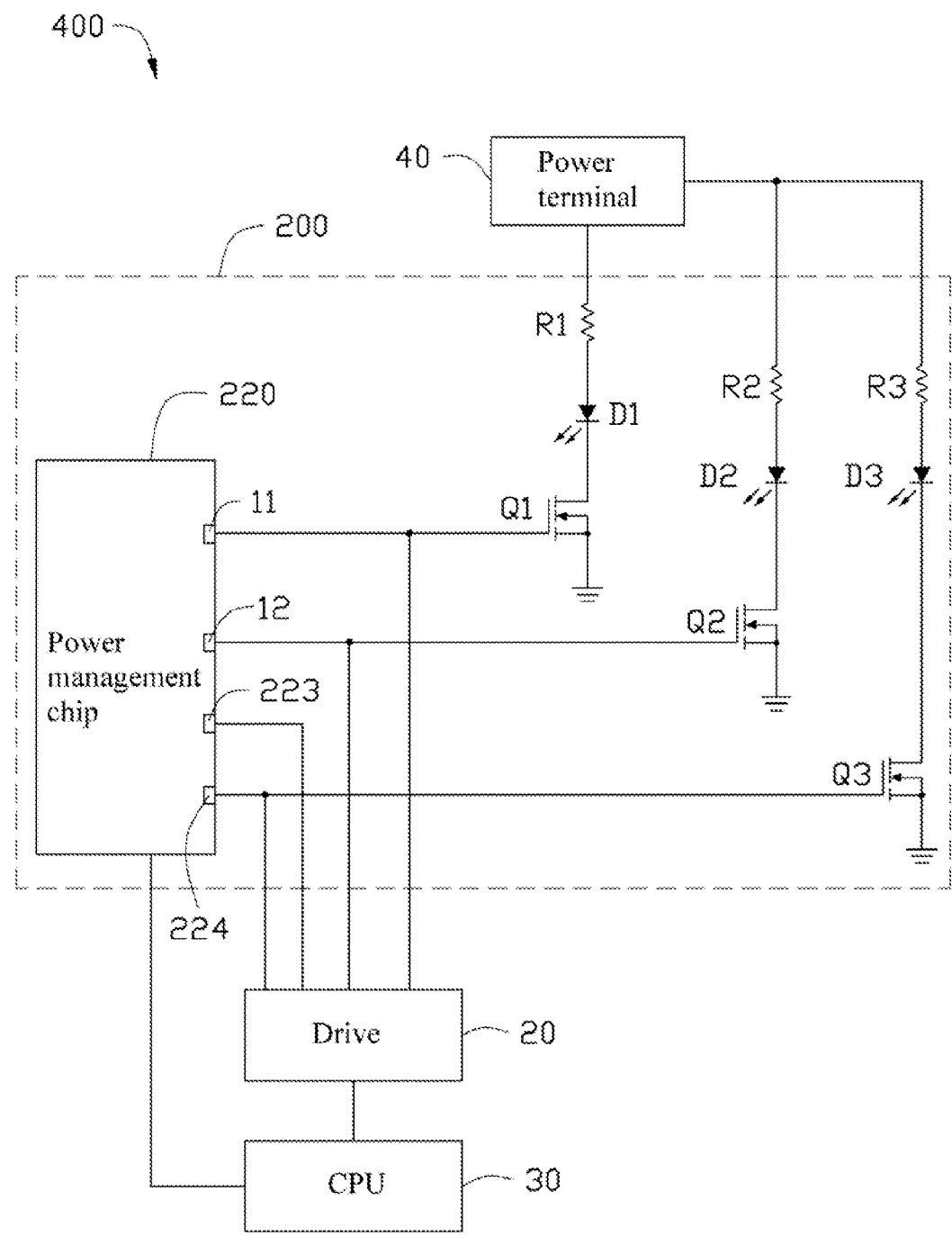
FIG. 2 is a circuit diagram of a second exemplary embodiment of a motherboard.

Referring to the FIG. 2, a second embodiment of a motherboard 400 is similar to the first embodiment. In the second embodiment, the power management chip 220 is a four-phase power management chip. That is, the power management chip 220 includes a first phase output terminal 11, a second phase power output terminal 12, a third phase output terminal 223, and a fourth phase output terminal 224. The voltage-state display system 200 includes the power management chip 220, a first transistor Q1, a second transistor Q2, a first LED D1, a second LED D2, a first resistor R1, a resistor R2, a third transistor Q3, a third LED D3, and a third resistor R3. The first to fourth phase output terminals 11, 12, 223, and 224 are all connected to the drive 20.

The power management chip 220 has three states, namely the PS0, PS1, and PS2 states, and according to the above-mentioned INTEL standard, the state of a third PWM signal output by the third phase output terminal 223 is the same as the state of a fourth PWM signal output by the fourth phase output terminal 224. That is, if the third phase output terminal 223 is continuously outputting the third PWM signal, so is the fourth phase output terminal 224. Therefore, either one of the third and fourth phase output terminals 223 and 224 may be connected to the third LED D3 to denote the voltage mode of the CPU 30. In the second embodiment, the third LED D3 is connected to the fourth phase output terminal 224 of the power management chip 220. In detail, the fourth phase output terminal 224 of the power management chip 220 is connected to a control terminal of the third transistor Q3. A first terminal of the third transistor Q3 is connected to a cathode of the third LED D3. A second terminal of the third transistor Q3 is grounded. An anode of the second LED D3 is connected to the power terminal 40 through the third resistor R3.

In the second embodiment, when all of the three LEDs D1-D3 are lit, it denotes that the power management chip 10 is in the PS0 state, and the voltage mode of the CPU 30 is the PS0 mode. When the first LED D1 or the first and second LEDs D1 and D2 together are lit, while the third LED D3 is not lit, it denotes that the power management chip 10 is in the PS1 state, and the voltage mode of the CPU 30 is the PS1 mode. When the first LED D1 flickers, and neither of the second and third LED D2 and D3 are lit, it denotes that the power management chip 10 is in the PS2 state, and the voltage mode of the CPU 30 is the PS2 mode.

In the embodiments, the first to third transistors Q1-Q3 are n-channel field effect transistors (FETs). The control terminal, the first terminal, and the second terminal of each of the first to third transistors Q1-Q3 are a gate, a drain, and a source of the FET.

Although numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:
1. A motherboard comprising:
  a voltage-state display system comprising:
    a first transistor comprising a control terminal, a first terminal grounded, and a second terminal;
    a second transistor comprising a control terminal, a first terminal grounded, and a second terminal;
    a first light emitting diode (LED) connected to the second terminal of the first transistor;
    a second LED connected to the second terminal of the second transistor; and
    a power management chip comprising:
      a first phase output terminal connected to the control terminal of the first transistor to output a first pulse width modulation (PWM) signal; and
      a second phase output terminal connected to the control terminal of the second transistor to output a second PWM signal;
  a drive connected to the first and second phase output terminals to receive the first and second PWM signals, and output a voltage according to the received first and second PWM signals; and
  a central processing unit (CPU) connected to the drive to receive the output voltage from the drive, and connected to the power management chip to output a control instruction to the power management chip to denote a voltage mode provided to the CPU, thereby controlling the power management chip to adjust the first and second PWM signals;
  wherein when the power management chip is in a PS0 state, the first phase output terminal continuously outputs the first PWM signal to the control terminal of the first transistor, and the second phase output terminal continuously outputs the second PWM signal to the control terminal of the second transistor, the first and second LEDs is lit to denote the voltage mode of the CPU is the PS0 mode; when the power management chip is in a PS1 state, the first phase output terminal continuously outputs the first PWM signal to the control terminal of the first transistor, while the second phase output terminal does not output the second PWM signal, the first LED is lit, and the second LED is not lit, to denote the voltage mode of the CPU is the PS1 mode; when the power management chip is in a PS2 state, the first phase output terminal discontinuously outputs the first PWM signal to the control terminal of the first transistor, while the second phase output terminal does not output the second PWM signal, the first LED flickers, and the second LED is not lit, to denote the voltage mode of the CPU is the PS2 mode.

2. The motherboard of claim 1, further comprising a power terminal, wherein a cathode of the first LED is connected to the second terminal of the first transistor, an anode of the first LED is connected to the power terminal, a cathode of the second LED is connected to the second terminal of the second transistor, an anode of the second LED is connected to the power terminal.

3. The motherboard of claim 2, wherein the voltage-state display system further comprises a first resistor and a second resistor, the anode of the first LED is connected to the power terminal through the first resistor, the anode of the second LED is connected to the power terminal through the second resistor.

4. The motherboard of claim 1, wherein the first and second transistors are n-channel field effect transistors (FETs), the control terminal, the first terminal, and the second terminal of each of the first and second transistors are respectively a gate, a source, and a drain of the FET.

5. The motherboard of claim 4, wherein the power management chip further comprises a third phase output terminal, the voltage-state display system further comprises a third transistor and a third LED, the third phase output terminal is connected to a control terminal of the third transistor, a first terminal of the third transistor is grounded, a second terminal of the third transistor is connected to the third LED to control the third LED, when the power management chip is in the PS0 state, the third phase output terminal continuously outputs a third PWM signal to the control terminal of the third transistor, the first to third LEDs are lit to denote the voltage mode of the CPU is the PS0 mode; when the power management chip is in the PS1 state, the third phase output terminal does not output the third PWM signal, the first LED is lit, and the second and third LEDs are not lit, to denote the voltage mode of the CPU is the PS1 mode; when the power management chip is in the PS2 state, the third phase output terminal does not output the third PWM signal, the first LED flickers, and the second and third LEDs are not lit, to denote the voltage mode of the CPU is the PS2 mode.

* * * * *